United States Patent [19]
Cocca

[11] Patent Number: 5,302,997
[45] Date of Patent: Apr. 12, 1994

[54] COMPOSITE PHOTOMETRIC AND RANGE FINDING ELEMENT ARRAY

[75] Inventor: J. David Cocca, Pittsford, N.Y.

[73] Assignee: Eastman Kodak Company, Rochester, N.Y.

[21] Appl. No.: 997,386

[22] Filed: Dec. 28, 1992

[51] Int. Cl.$^5$ .............................................. G03B 7/08
[52] U.S. Cl. ..................................... 354/432; 354/402
[58] Field of Search ............... 354/402, 406, 407, 408, 354/432, 429, 430, 431

[56] References Cited

U.S. PATENT DOCUMENTS

| | | | |
|---|---|---|---|
| 4,643,557 | 2/1987 | Ishizaki et al. | 354/406 |
| 4,684,995 | 8/1987 | Baumeister | 358/227 |
| 4,697,905 | 10/1987 | Fujibayashi et al. | 354/406 |
| 4,969,005 | 11/1990 | Tokumaga | 354/414 |
| 4,974,007 | 11/1990 | Yoshida | 354/402 |
| 4,977,423 | 12/1990 | Yamano et al. | 354/432 |
| 5,040,014 | 8/1991 | Hata et al. | 354/402 |
| 5,049,916 | 9/1991 | O'Such et al. | 354/412 |
| 5,128,707 | 7/1992 | Moramatsu | 354/408 |
| 5,146,258 | 9/1992 | Bell et al. | 354/432 |

Primary Examiner—Russell E. Adams
Attorney, Agent, or Firm—David M. Woods

[57] ABSTRACT

A multiple photosensitive element array and lens system particularly adapted for use in a camera for providing scene image light intensity signals for use in automatic exposure and automatic focus control. A two-dimensional photometric sensor array of planar photosensitive array segments is centrally disposed on an integrated circuit substrate so that the planar segments each receive light from corresponding segments of the image focused thereon for developing first light intensity related signals in response thereto. At least one pair of linear range arrays, each comprising a plurality of photosensitive elements, is mounted on the substrate on either side of the two-dimensional sensor array, such that the linear range arrays are separated by a baseline distance extending across the two-dimensional photometric sensor array. A lens system is provided for focusing an image of a scene to be photographed upon each of the two-dimensional photometric sensor array and the linear photosensitive element range arrays. The photosensitive elements of the pair of linear photosensitive element arrays each receive light from a fractional portion of the image focused thereon and develop second light intensity related signals in response thereto. The segments of the sensor array preferably include a central segment, a first plurality of inner segments and a second plurality of outer segments, wherein each segment is closely spaced and electrically insulated from adjacent segments. The photosensitive array and lens system is preferably employed in a camera having an autofocus control system for controlling the focus of a camera imaging lens based on the second light intensity related signals and an autoexposure control system for controlling the exposure of an image of the scene based on the first light intensity related signals.

12 Claims, 3 Drawing Sheets

COMPOSITE PHOTOMETRIC AND RANGE FINDING ELEMENT ARRAY

FIELD OF THE INVENTION

The present invention relates to light measuring and range finding devices, and more particularly to a camera having automatic exposure and automatic focus range-finding photosensor arrays fixed on a common substrate.

BACKGROUND OF THE INVENTION

In recent years, automatic focus or autofocus (AF) and automatic exposure (AE) video and still photographic cameras have come into common usage as the cost of integrated circuits, photosensors, and miniaturized servo systems for adjusting the focal length of the imaging lens and controlling the exposure time period have become much less expensive. In addition, the availability of inexpensive microprocessors, RAM and ROM chips, and other microcontroller components has allowed designers to incorporate sophisticated algorithms with active or passive range sensors for AF systems and with multi-segmented photometric sensor arrays for AE systems to provide the user with highly accurate "point and shoot" capabilities. These capabilities have been incorporated in relatively simple range finder photographic cameras and highly complex single lens reflex (SLR) photographic still cameras as well as in video cameras.

The development and incorporation of multi-segmented photosensor integrated circuit arrays for use in photographic still cameras is summarized in commonly assigned U.S. Pat. No. 5,146,258 to Bell et al, incorporated herein by reference in its entirety. The '258 patent discloses an improved multi-segmented photometric sensor coupled to selection circuitry for selecting a combination of the signals derived from each segment of the sensor for setting the exposure conditions of the image captured by the camera. The photometric sensor may also be used in conjunction with an electronic strobe flash for providing a reflected light intensity feedback signal that is processed and employed to set the duration of the flash.

In AF control systems, active or passive range finders have been developed to provide signals from which the distance between the camera body and (typically) the subject or structure in the scene that the user has centered the imaging lens on may be determined and employed with a motorized servo-system to adjust the focal length of the imaging lens. Passive range finders employ one or more pairs of linear photo-diode arrays that are positioned a fixed distance apart which forms the baseline of the autoranging triangulation system. In triangulation AF systems, the baseline is a necessary dimension which allows for the formation of similar triangles used to calculate subject distance. Generally, as the baseline dimension and focal length increases and the linear sensor array width (pitch) decreases, the maximum sensing distance increases.

Typically, a pair of focusing lenses are positioned with respect to each pair of spaced apart linear photosensitive arrays to focus the image the camera is pointed at onto the linear arrays. In SLR camera systems, the focusing lenses are arranged symmetrically with respect to the optical axis of the camera's imaging lens and light passing through the lens (TTL) is diverted by half silvered mirrors through the pair of focusing lenses and onto the linear arrays. In range finder cameras, the pair of focusing lenses and the associated linear arrays of photosensitive elements are mounted on the camera a distance away from the imaging lens.

The photo-electrically converted signals from the photosensitive elements of the linear arrays are processed by the microprocessor based AF control algorithm to detect a displacement of the two images focused thereon and to provide a control signal to a motor which drives a gear mechanism to adjust the imaging lens focus. The operation of a typical AF system is described in U.S. Pat. No. 4,643,557 to Ishizaki et al (incorporated by reference herein in its entirety) and is referred to in the above incorporated '259 patent.

Various efforts have been made to reduce the number of photosensitive components and lensing systems necessary for providing accurate AE, AF and photoflash control by employing signals derived from the segments of the multicell photometric arrays in conjunction with or in substitution for signals developed from the linear arrays of photosensitive elements to fine tune the AE and AF functions as described in the above incorporated '258 and '557 patents. In video cameras, where two dimensional CCD arrays are employed, output signals from selected CCD elements are employed in AF and AE operations as disclosed in commonly assigned U.S. Pat. No. 4,684,995 to Baumeister. After analog to digital conversion, the most significant bit and least significant bit portions of the digitized word corresponding to the analog signal output of the selected CCD elements are employed in automatic focus and exposure adjustments. Simultaneously, the digital word information is processed to develop the recorded video information for each corresponding pixel of the image being recorded.

In a similar fashion, although employing redundant photosensitive elements, U.S. Pat. No. 4,974,007 to Yoshida describes a range sensor of multiple pairs of linear photosensitive element arrays and a multi-segment photometric sensor, where the pairs of linear arrays are spaced so as to coincide with segments of the photometric sensor. The range sensor and photometric sensor are formed on separate IC substrates and are employed in a TTL arrangement within an SLR camera where separate lensing elements image the scene viewed through the imaging lens of the camera onto the respective sensors. The signals developed by the photometric sensor segments and the pairs of linear photosensitive element arrays are combined to provide AF and AE functions, particularly for the automatic exposure control of the flash duration. While the positioning of the linear photosensitive element arrays of the range sensor so that they fall within each segment of the photometric sensor of the '007 Patent may have certain utility in TTL arrangements, the advantages that may be gained thereby in that context are achieved at the cost of substantial reduction in the baseline between respective pairs of linear arrays employed in the AF function.

Despite these advances, problems remain in the integration of the components of the AF and AE systems to achieve miniaturization, low cost and accuracy in both assembly in-camera systems and correlation of the signals derived by the range sensor and photometric sensor elements. In practice, the separate integrated circuit chips on which the photometric sensor arrays and linear range sensor arrays are formed must be precisely aligned during assembly of the camera with the camera imaging lens, the viewfinder optics and with each other. The four alignment operations are time consuming, and alignment errors affect camera AF and AE functions that result in poor quality photo images.

SUMMARY OF THE INVENTION

It is therefore an object of the present invention to provide an improved autofocus and autoexposure control system with a photometric sensor comprising an array of planar photosensitive segments and a range sensor comprising at least one pair of linear photosensitive elements combined on a single integrated circuit substrate.

It is a further object of the present invention to provide an integrated or composite lensing system for focusing image light separately on the integrated array of planar photosensitive segments and the pair(s) of linear photosensitive elements arranged formed or mounted on the single integrated circuit substrate.

These and other objects of the present invention are realized in an improved multiple photosensitive element array particularly adapted for use in a camera for providing scene image light intensity signals for use in automatic exposure and automatic focus control comprising a two-dimensional array of planar photosensitive elements forming a photometric sensor, wherein the planar elements each receive light from segments of the image focused thereon for developing light intensity related signals in response thereto, at least one pair of linear photosensitive element arrays together forming a range sensor, each linear array comprising a plurality of photosensitive elements mounted on either side of the photometric sensor array of planar photosensitive elements, such that the range sensor arrays are separated by a baseline distance extending across the two-dimensional photometric sensor array, and a lens system for imaging a scene to be photographed upon each of the photometric sensor array and the linear range sensor arrays.

In accordance with the preferred embodiment of the present invention, the photometric sensor array is formed of a plurality of planar segments arranged in a rectangular format corresponding in shape to the film image format wherein the segments include a central segment, a first plurality of inner segments and a second plurality of outer segments, wherein each segment is closely spaced and electrically insulated from adjacent segments and is separately electrically connected to a set of amplifiers and signal processing circuits for providing a digitized signal representative of the intensity of light from the portion of the scene focused on the segment by the focusing lens. The linear photosensitive element arrays of the range sensor are preferably arranged on either side of the outer segments of the photometric sensor array, and each photosensitive element is connected to a respective amplifier and signal processor for providing digitized output signals for use in the autofocus control system.

Advantageously, the range sensor and photometric sensor arrays are formed on a single integrated circuit substrate. The positioning of a photometric sensor array between the pair of range sensor arrays makes use of the baseline distance space needed to calculate subject distance, and the relatively wide baseline enhances the sensitivity of the autofocus system.

The consolidation of the photometric and range sensor arrays on the same IC chip and optical system decreases the complexity of alignment with the camera imaging lens since the arrays are inherently aligned to one another. In addition, fabrication on a common IC chip allows a reduction in input and output lines with respect to the camera microcontroller chip and, in general, reduces the total number of parts.

Other objects, advantages and features of the invention will become more apparent in the detailed description of the preferred embodiments thereof presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
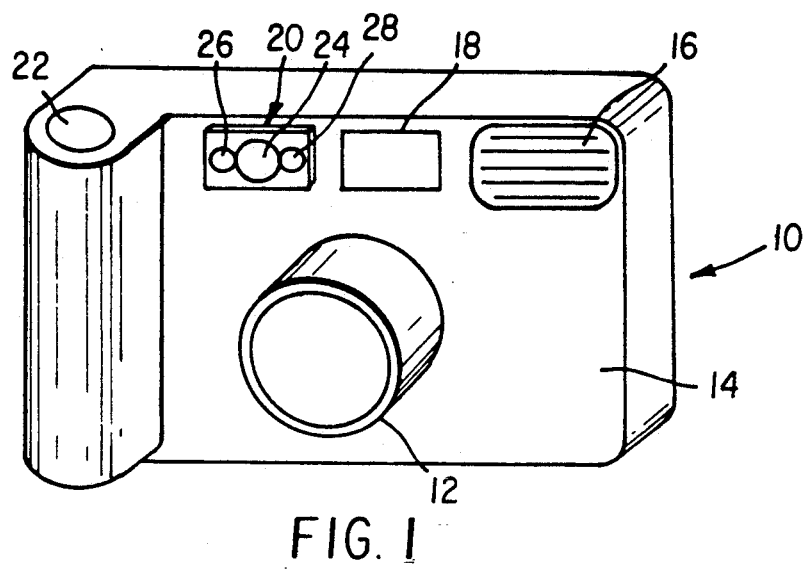
FIG. 1 is a simplified view of a range finder camera in which the present invention may be implemented.

FIG. 1 shows a range finder type camera in which the present invention may be implemented. The camera 10 includes an imaging lens 12 projecting from the camera body 14. A flash lamp 16 is built into the camera body adjacent to the view finder 18 and the integrated lens array 20 which overlies the integral linear range sensor and planar photometric sensor arrays of the present invention. A shutter release button 22 is provided overlying the motorized film cartridge receptacle and film advance mechanism. The mechanical configuration of the camera with the exception of the lens array 20 and the integral photometric and range sensor arrays of the present invention may take the form of the Kodak S500 AF 35 mm camera or other suitable cameras that have AE and AF functions.

Figure 2:
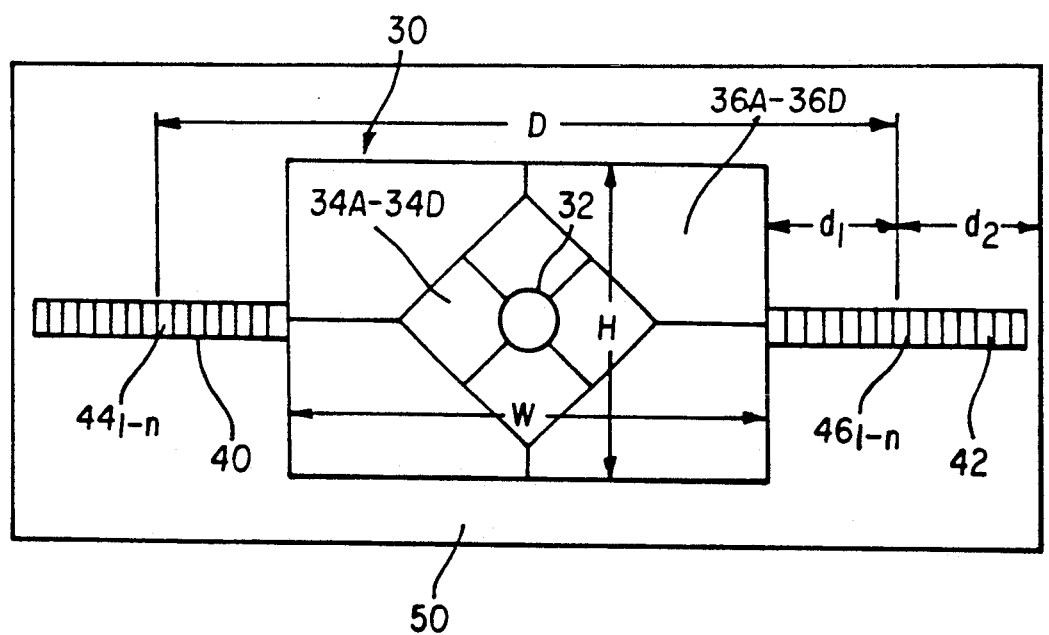
FIG. 2 is a simplified schematic illustration of the combined photometric sensor and range sensor arrays of the present invention.

Turning now to FIG. 2, it illustrates in a schematic view the positioning of a pair of linear range sensor photosensitive element arrays in relation to the two-dimensional photometric sensor array disclosed in the above incorporated '258 patent. The planar photometric sensor array 30 and the linear range sensor arrays 40 and 42 are fabricated as integrated circuit photosensitive elements on a substrate 50 having lead wires extending from each of the integrated circuit photosensitive elements extending to bonding pads (not shown) in a manner well known in the integrated circuit fabrication art.

The two-dimensional photometric sensor array 30 comprises nine planar photosensor elements or segments occupying a rectangular space having a height H and a width W. The segments of the sensor array 30 include the centrally disposed circular segment 32, the four half-orthogonally disposed inner segments 34A-34D and the four outer segments 36A-36D. The pattern of the inner and outer segments is symmetrical and renders the photometric sensor array 30 insensitive to exposures made with the camera held in horizontal and vertical orientations. Each photosensitive segment operates as a photodiode, wherein the photon-induced current output signal of each instantaneously represent the intensity of the illumination that impinges on its surface.

The first and second linear range sensor arrays 40 and 42 comprise n photodiodes $44_1$–$44_n$ and $46_1$–$46_n$, respectively. The linear range sensor arrays 40 and 42 each extend a distance $d_1$ from either side of the planar photometric sensor array 30 and a further distance $d_2$ from a bounding line of the integrated circuit 50. The actual boundaries of the integrated circuit 50 may vary, but the distances $d_1$ and $d_2$ are selected so that light passing through the associated focusing lens elements 26 and 28 for the range sensor arrays 40 and 42 falls within the distances represented by $d_1$ and $d_2$ and not on any of the photosensitive segments of the two-dimensional photometric sensor array 30.

Referring back to FIG. 1, the integrated lens array 20 comprises an inner photometric sensor lens element 24 for focusing the image the camera is aimed at onto the segments of the planar photometric sensor array 30. Similarly, the laterally displaced first and second range sensor lens elements 26 and 28 depicted in FIG. 1 are spaced apart by the baseline distance D so as to focus light on the image onto the first and second range sensor arrays 40 and 42, respectively. Suitable baffles may be provided in the package behind the integrated lens array 20 to prevent light focused by each of the lens elements 24, 26 and 28 from straying and impinging on photosensitive elements or segments other than those described above.

Figure 3:
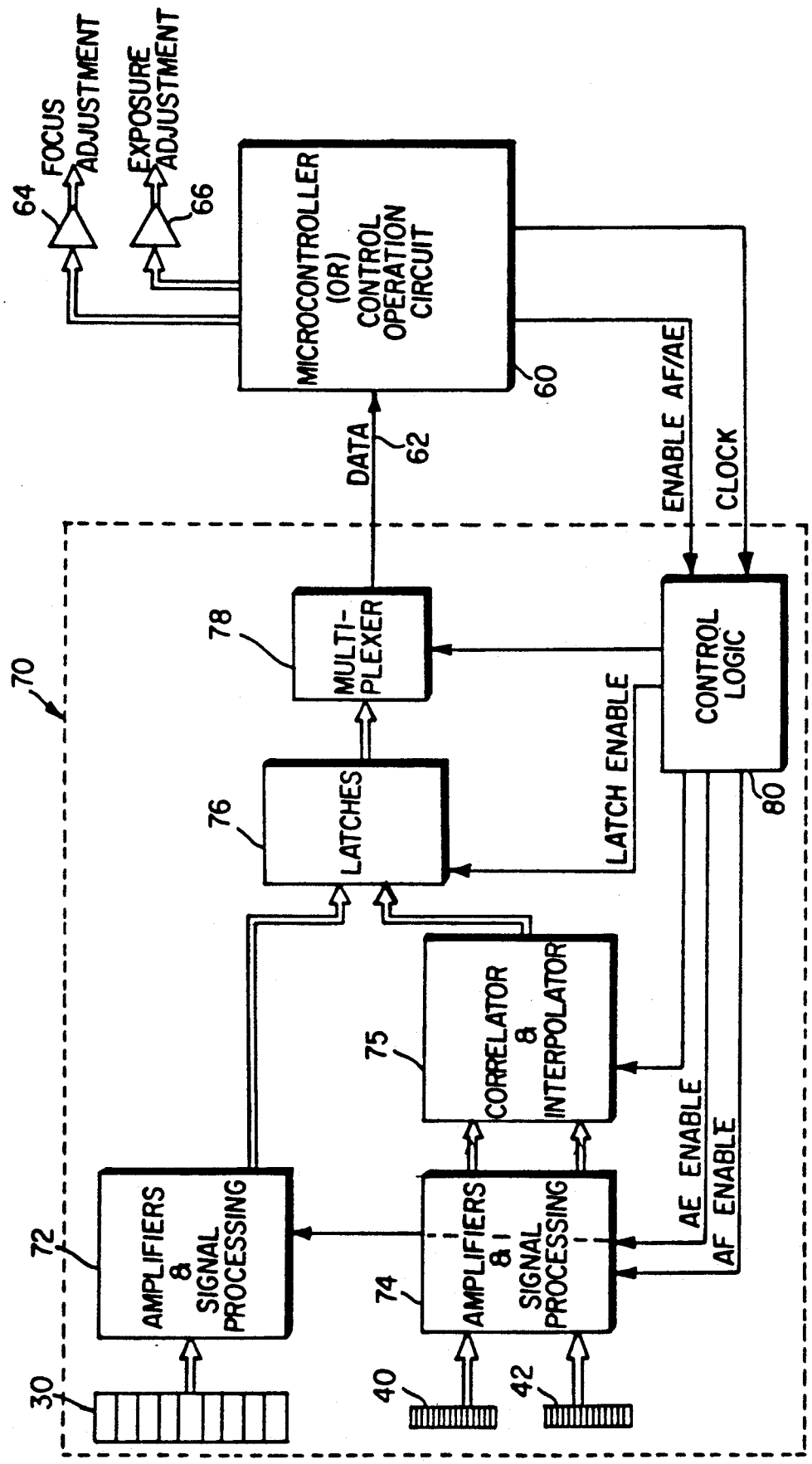
FIG. 3 is a circuit block diagram of an automatic exposure and automatic focus control system employing the photometric and range sensor arrays of the present invention.

Turning now to FIG. 3, it illustrates in part the electronic operating system of the camera. In this regard, commonly assigned U.S. Pat. No. 5,049,916 to O'Such et al describes a comprehensive camera operating system employing a microcomputer system and associated hardware operated under the control of stored algorithms for controlling all of the functions of the camera described herein and other functions and operations common to current electronically controlled photographic cameras. In accordance with the present invention, that portion of the camera operating system relating to use of the combined planar photometric sensor array and the linear range sensor array of FIG. 2 are described in detail while the other operating systems of such a camera disclosed in the '916 patent are incorporated herein by reference.

In this regard, the microcontroller or control operation circuit 60 will be understood to include a microprocessor, read only memories (ROMs), random access memory (RAM), communication ports and input and output latches and buffers all interconnected through address and data lines and buses. The preferred implementation for the microcontroller 10 is a microprocessor, such as the Motorola 68HC805B6 which has a built-in A/D converter. The camera microcontroller also receives inputs from other camera transducers, such as an autofocus sensor, a camera orientation sensor and a camera-user interface. The user interface may be as simple as a shutter button or may embody additional features such as multiple light metering modes and override command switches. If the camera is a telephoto or zoom model, the taking lens focal length may also be accessed by the microcontroller from the zoom lens and the zoom position indicator.

Microcontroller 60 thus contains interrupt circuits, control and power circuits and input buffers and latches and the like for responding to these various status and control input signals and others, such as the state of the shutter release button 22, the motor advance mechanism, flash unit specifications, characteristics of the film in the camera, and the like. The output latches and drivers are employed to store temporarily and apply control signals to the shutter release, photoflash, film advance motor drive, imaging lens servo control system for AF, and lens aperture and/or shutter speed control for AE, etc.

For the purposes of describing the present invention, FIG. 3 illustrates the signal processing circuitry for providing photometric and range-finding data on a data line 62 to the microcontroller 60 which provides control signals to a first output driver 64 for effecting automatic exposure (AE) control and the second output driver 66 for actuating and driving the motorized lens focus adjustment servo mechanism for automatic focus (AF) control. Other inputs and outputs from the microcontroller 60 are not illustrated in FIG. 3.

The AE and AF circuit block diagram 70 includes a first set of amplifiers and signal processing circuits 72 that are coupled to the nine segments of the two-dimensional photometric sensor array 30 and a second set of amplifiers and signal processing circuits 74 that are coupled to the first and second linear range sensor arrays 40 and 42. The photocurrent output signals from each photodiode element in the photometric and range sensor arrays 30, 40, 42 applied to the conventional amplifier and signal processing circuits are converted from current to voltage signals, amplified, subjected to logarithmic compression and converted from analog to digital signals. These functions can be accomplished with any of a number of conventional operational amplifiers which substantially meet the ideal requirements of infinite input impedance, zero output, zero input bias current, zero input offset voltage, voltage gain of infinity, and high gain-bandwidth product coupled to A/D converters.

The digitized output signals from the amplifier and signal processing circuit 72 is stored in a set of latches 76. The stored data is applied to the multi-plexer circuit 78 which serially outputs the data onto the data line 62 after the measurements are taken upon initial partial depression of a shutter button in response to commands from control logic 80 in a sequence known in the art and described with reference to FIG. 4. The digitized output signals from the amplifier and signal processing circuit 74 are applied to the correlation and interpolation circuit 75 which provides an output signal to the latches 76 as described hereafter.

Figure 4:
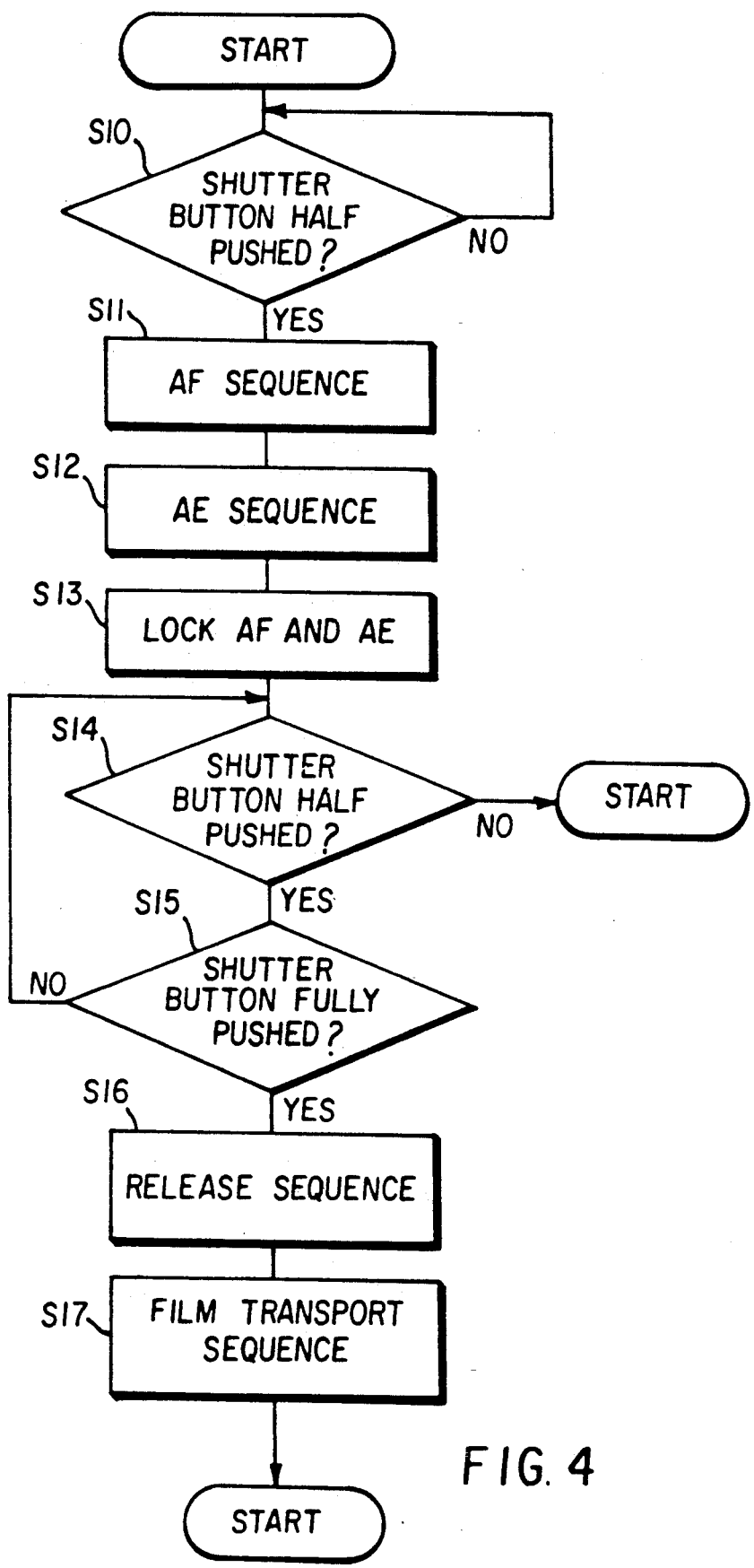
FIG. 4 is a simplified general flow chart of the sequence of a complete operation of the camera in making an exposure employing the autofocus and autoexposure control system of FIG. 3.

FIG. 4 shows a flow diagram of all the operational steps of making an exposure with an automatic camera of the type described above. The photographer first views the scene to be photographed through the range finder and typically centers viewfinder on the principal subject of interest in the scene and then partially depresses the shutter release button (step S10). The microcontroller stored algorithm responds to the partial shutter depression interrupt and provides the Enable AF and Enable AE commands to the control logic 80. The control logic 80 sequentially or simultaneously enables the amplifier and signal processing circuits 72 and 74, latches the digitized intensity signal values in latches 76 and transfers the data to the line 62 through the multi-plexer 78.

When the user turns on the camera and transmits, via the user-interface, his desire to take a picture, the camera microcontroller 60 (in step S10 of FIG. 4) directs the control logic 80 to connect the photodiodes from the array 30 to the amplifiers and signal processing circuits 72. Intensity variations in the scene light arising typically from line powered artificial illumination may need to be filtered out. This is conventionally done by passing the signal output by the photosensitive element through a low pass filter (not shown) or by taking repetitive samples of the intensity and averaging out the variation. The first technique is slow to stabilize on power-up and also slow when switching between photocurrents of significantly different levels. The second approach is fast, but requires digital processing capability. For the configuration of light meter circuit described, the second approach is used. The instantaneous current signal from that diode is conditioned, digitized and stored in a memory (in this case, internal to the camera control IC). Each photodiode is sampled at a rate to average out the 60 Hz effects of artificial lighting. The averaged value is then used in a light metering algorithm. This process is repeated for each photodiode in the array 30. Depending on the conversion speed of the A/D circuitry, the multiple samples of all or many of the photodiodes can be accomplished within a single 8.333 msec half cycle.

Once the set of first light intensity related signals are processed and stored as data in memory, a number of known algorithms can be applied to utilize the information from the photometric sensor array 30. For example, in the "matrix" light metering mode, all diode data are used in the evaluation. It is common for matrix light metering algorithms to determine the contrast in the scene by computing the differences in signal values between the segments. Sometimes, depending on the relative locations of the brightest and darkest segments, and sometimes depending on the intensity of the center spot, the scene is classified as a particular type. Each type has associated segment weighting factors derived from statistical analysis of photographic scenes. The exposure value may then be determined by $$EV = \sum_{i=1}^{9} c(i)I(i)$$

where $c(i)$ are the combined calibration and statistical weighting factors and $I(i)$ are the photodiode intensity values.

In the spot metering mode, the microcontroller 60 directs the control logic 80 to connect only the photodiode in the center spot into the remaining circuitry. The exposure value is then determined by $$EV = cI,$$

where c is a calibration correction factor and I is the center photodiode intensity value.

The described photodiode element pattern has numerous attributes to its spatial design. The photodiode pattern is rotationally symmetric. With this pattern, any light metering algorithm can be made insensitive to camera rotation. To accomplish this, the camera microcontroller would check the camera orientation sensor, which sensor in the simplest form may be a mercury switch. Typically, the camera algorithms are programmed for data gathered in the normal camera horizontal orientation. If an orientation sensor is included in the camera, the orientation sensor indicates that the camera has been rotated, perhaps for a vertical picture, then the symmetry of the photodiode pattern allows complete correction. Of course, in the practice of the invention, non-symmetric photosensitive elements of the photometric array may be substituted for the above described and depicted array 30.

The autoranging amplifier and signal processing circuits 74 converts the radiation intensity of light from the portion of scene impinging over time on each photodiode element $44_1$–$44_n$ and $46_1$–$46_n$ of the linear arrays 40 and 42 to an electrical signal. Each photodiode element is connected to a comparator circuit in the amplifier and signal processing circuits 74, such that when the linear range sensor arrays 40 and 42 are enabled, the collected photocurrent signal from each photodiode is measured, and when all the comparators' thresholds have been met, the light sensing is complete. This is necessary because lower light level scenes require longer integration times from the photodiodes. After the last of the photodiode element photocurrent signal has met the minimum threshold, the respective pair of second light intensity related signals generated thereby can be amplified, processed and applied to the correlation and interpolation circuit 75 to develop the digitized range signal latched in latches 76.

Correlating of the left and right array pair of second light intensity related signals is conducted in the correlation and interpolation circuit 75. The two sets of second light intensity related signals are compared for all possible combinations until the closest correlated values are established. The offset derived from this correlation function produces a digital representation of the distance through the principals of triangulation which is sent to the latches 76. The signal can be further discriminated in circuit 75 through an interpolation function, whose results can also be sent in digitized form to the latches 76. Finally, default conditions can also be sent to the latches 76 based on abnormal conditions found through the correlating and interpolation functions.

Further stored weighting and comparison algorithms in microcontroller 60 perform the AF and AE operation sequences in response to these calculations and lock the camera focus and exposure values individually (steps S11–S13). Typically, these operations may be completed in 50–60 ms.

It is to be noted here that if the photographer releases the half-depressed shutter release button, the AF operation and the AE operation are unlocked and the camera returns to the initial start block (step S14). The photographer while keeping the shutter release button in the half-depressed position may change the scene framing until a desired composition is attained, and then further pushes the shutter button to the full stroke (step S15). In response to this input signal, the microcontroller provides the focus adjustment signal at driver 64 so that the lens motor drive focuses the lens on the main object and provides the exposure adjustment commands at driver 66 so that the aperture and shutter speed combination makes a proper exposure for each film type.

If the scene is dark or backlighted, the flash unit is fired when the camera release is actuated (step S16). When the release sequence ends, a film transport is automatically carried out (step S17). Thereafter, the microcontroller status is restored to the start condition. If the desired scene is framed at the outset, the photographer may depress the shutter release button in a continuous stroke. In that case, steps S14 and S15 are effectively bypassed.

Although not specifically shown, it will be understood that an additional step of assessing the general scene light level at the depression of the shutter release button may cause the emission of a low intensity light beam, e.g., an infrared emitting diode beam that illuminates the subject sufficiently to allow the range finding operation to take place more rapidly.

Though the embodiment has been described in connection with the two-dimensional photometric sensor array 30 depicted in FIG. 2, any configuration of photosensitive element segments having a greater or lesser number and differing shapes may be used to achieve a further improvement of the accuracy and reliability.

Although what is considered to be the preferred embodiments of the invention have been described in detail, it will be manifest that many modifications may be made therein without departing from the essential spirit of the invention. It is intended, therefore, in the annexed claims to cover all such changes and modifications as may fall within the true scope of the invention.

What is claimed is:

1. A multiple photosensitive element array positioned on a common substrate and lens system particularly adapted for use in a camera for providing scene image light intensity signals for use in automatic exposure and automatic focus control comprising:

a two-dimensional photometric sensor array of one or more planar photosensitive elements positioned on said substrate, wherein each of said planar elements receives light from a segment of the image focused thereon and develop one or more respective first light intensity related signals in response thereto;

at least one pair of linear photosensitive element arrays, each linear array comprising a plurality of photosensitive elements, positioned on said substrate either side of said two-dimensional array of planar photosensitive elements, such that said linear arrays are separated by a baseline distance extending across said two-dimensional photometric array and wherein said elements of said pair of linear photosensitive element arrays each receive light from a fractional portion of the image focused thereon and develop a respective pair of second light intensity related signals in response thereto; and a lens system having lens means for focusing a segment of said image upon each photosensitive element of said two-dimensional photometric array and at least a portion of the same image upon said linear photosensitive element arrays.

2. The photosensitive array and lens system of claim 1 wherein:

said photometric sensor array is formed of said plurality of planar photosensitive elements arranged in a rectangular format corresponding in shape to an image capturing format; and said planar photosensitive elements include a central element and one or more peripheral elements surrounding said central element and within said rectangular format.

3. The photosensitive array and lens system of claim 2 wherein said camera includes an image recording medium and an imaging lens that may be adjusted to focus said image on said recording medium and further comprising:

first means for deriving automatic exposure control signals for controlling the exposure of said image on said recording medium in said camera from said first light intensity related signals; and second means for deriving automatic focus control signals for adjusting the focus of said camera imaging lens from said second light intensity related signals.

4. The photosensitive array and lens system of claim 3 wherein said first and second means further comprise: amplifiers and signal processing circuits for providing a signal representative of the intensity of light from the segment or portion of the scene focused on each of said photosensitive elements by said lens system.

5. The photosensitive array and lens system of claim 1 wherein said camera includes an image recording medium and an imaging lens that may be adjusted to focus said image on said recording medium and further comprising:

first means for deriving automatic exposure control signals for controlling the exposure of said image on said recording medium in said camera from said first light intensity related signals; and second means for deriving automatic focus control signals for adjusting the focus of said camera imaging lens from said second light intensity related signals.

6. The photosensitive array and lens system of claim 5 wherein said first and second means further comprise: amplifiers and signal processing circuits for providing a signal representative of the intensity of light from the segment or portion of the scene focused on each of said photosensitive elements by said lens system.

7. A multiple photosensitive element array positioned on a common substrate and lens system particularly adapted for use in an image recording camera for providing scene image light intensity signals for use in automatic exposure and automatic focus control comprising:

a two-dimensional photometric array of one or more planar photosensitive elements situated between first and second borderlines and positioned on said substrate, wherein said one or more planar elements each receive light from one or more corresponding segments of an image focused thereon for developing one or more first light intensity related signals in response thereto;

first and second linear photosensitive element arrays, each array comprising a plurality of photosensitive elements positioned on said substrate, said first linear array extending from a point adjacent to said first borderline and away from said two-dimensional array of planar photosensitive elements, said second linear array extending from a point adjacent to said second borderline and away from said two-dimensional array of planar photosensitive elements, whereby said first and second linear arrays are separated by a baseline distance extending across the two-dimensional photometric array and wherein said photosensitive elements of said first and second linear arrays each receive light from a fractional portion of the image focused thereon and develop second light intensity related signals in response thereto; and a lens system having lens means for focusing said image of said scene to be recorded upon each of said two-dimensional photometric array and said first and second linear arrays.

8. The photosensitive array and lens system of claim 7 wherein:
   said photometric sensor array is formed of said plurality of planar photosensitive elements arranged in a rectangular format corresponding in shape to the recording medium imaging format; and
   said planar photosensitive elements include a central element and one or more peripheral elements surrounding said central element and within said rectangular format.

9. The photosensitive array and lens system of claim 8 wherein said camera includes an image recording medium and an imaging lens that may be adjusted to focus said image on said recording medium and further comprising:
   first means for deriving automatic exposure control signals for controlling the exposure of said image on said recording medium in said camera from said first light intensity related signals; and
   second means for deriving automatic focus control signals for adjusting the focus of said camera imaging lens from said second light intensity related signals.

10. The photosensitive array and lens system of claim 9 wherein said first and second means further comprise:
   amplifiers and signal processing circuits for providing a signal representative of the intensity of light from the segment or portion of the scene focused on each of said photosensitive elements by said lens system.

11. The photosensitive array and lens system of claim 7 wherein said camera includes an image recording medium and an imaging lens that may be adjusted to focus said image on said recording medium and further comprising:
   first means for deriving automatic exposure control signals for controlling the exposure of said image on said recording medium in said in said from said first light intensity related signals; and
   second means for deriving automatic focus control signals for adjusting the focus of said camera imaging lens from said second light intensity related signals.

12. The photosensitive array and lens system of claim 11 wherein said first and second means further comprise:
   amplifiers and signal processing circuits for providing a signal representative of the intensity of light from the segment or portion of the scene focused on each of said photosensitive elements by said lens system.

* * * * *